US008485707B2

(12) United States Patent
Lee

(10) Patent No.: US 8,485,707 B2
(45) Date of Patent: Jul. 16, 2013

(54) HEADLAMP FOR VEHICLE

(75) Inventor: Ki Hong Lee, Seoul (KR)

(73) Assignee: Kia Motors Corporation, Seoul (KR)

( * ) Notice: Subject to any disclaimer, the term of this patent is extended or adjusted under 35 U.S.C. 154(b) by 353 days.

(21) Appl. No.: 12/813,181

(22) Filed: Jun. 10, 2010

(65) Prior Publication Data

US 2011/0128751 A1 Jun. 2, 2011

(30) Foreign Application Priority Data

Dec. 1, 2009 (KR) ........................ 10-2009-0117992

(51) Int. Cl.
*F21V 7/00* (2006.01)
*B60Q 1/04* (2006.01)

(52) U.S. Cl.
USPC ............ 362/516; 362/519; 362/475; 362/507

(58) Field of Classification Search
USPC ................. 362/487, 507, 509, 514, 538, 522, 362/516, 519
See application file for complete search history.

(56) References Cited

U.S. PATENT DOCUMENTS

| | | | | |
|---|---|---|---|---|
| 5,477,440 | A * | 12/1995 | Brun | 362/510 |
| 6,474,852 | B1 * | 11/2002 | Ohkohdo et al. | 362/487 |
| 6,485,170 | B2 * | 11/2002 | Natsume | 362/509 |
| 6,637,923 | B2 * | 10/2003 | Amano | 362/545 |
| 6,796,695 | B2 * | 9/2004 | Natsume | 362/518 |
| 6,814,475 | B2 * | 11/2004 | Amano | 362/487 |
| 7,108,412 | B2 * | 9/2006 | Ishida et al. | 362/518 |
| 7,114,828 | B2 * | 10/2006 | Yagi | 362/231 |
| 7,530,712 | B2 * | 5/2009 | Lin et al. | 362/247 |
| 7,635,206 | B2 * | 12/2009 | Huang | 362/296.01 |
| 7,736,040 | B2 * | 6/2010 | Fujiwara et al. | 362/545 |
| 2004/0085779 | A1 * | 5/2004 | Pond et al. | 362/516 |
| 2006/0215415 | A1 * | 9/2006 | Suzuki et al. | 362/539 |
| 2008/0225540 | A1 * | 9/2008 | Tsukamoto et al. | 362/514 |

FOREIGN PATENT DOCUMENTS

| | | | |
|---|---|---|---|
| JP | 4-43501 | A | 2/1992 |
| JP | 10-116503 | A | 5/1998 |
| JP | 11-306810 | A | 11/1999 |
| JP | 2000-285722 | A | 10/2000 |
| JP | 2008-77889 | A | 4/2008 |
| JP | 2009-80993 | A | 4/2009 |
| KR | 20-0153317 | Y1 | 5/1999 |
| KR | 10-0387572 | B1 | 6/2003 |
| KR | 10-2006-0072710 | A | 6/2006 |
| KR | 20-2009-0004381 | U | 5/2009 |

* cited by examiner

*Primary Examiner* — Mariceli Santiago

(74) *Attorney, Agent, or Firm* — Morgan, Lewis & Bockius LLP

(57) ABSTRACT

Disclosed is a headlamp assembly for a vehicle. The headlamp assembly may include an LED module arranged in a housing of the headlamp, a reflector disposed in the housing and receiving a light from the LED module, wherein the reflector has uneven parts to disperse and reflect the light in a forward direction of the reflector, and a lens arranged in the front of the reflector.

8 Claims, 4 Drawing Sheets

HEADLAMP FOR VEHICLE

CROSS-REFERENCE TO RELATED APPLICATION

The present application claims priority to Korean Patent Application No. 10-2009-0117992, filed on Dec. 1, 2009, the entire contents of which is incorporated herein for all purposes by this reference.

BACKGROUND OF THE INVENTION

1. Field of the Invention

The present invention relates to a headlamp for a vehicle, and more particularly, to a headlamp for a vehicle, wherein the light emitted from the headlamp may be surface-emitted as an indirect-light type.

2. Description of Prior Art

Generally, a headlamp for a vehicle is called as a headlight, which is arranged at right and left sides in the front of the vehicle, respectively. The headlamp is a kind of a lamplight apparatus, wherein the headlamp irradiates the light toward the front of the vehicle so that a driver may secure a field of view toward the front of the vehicle when a driver travels along a dark road at night or when it is rainy, and accordingly, the driver may see the front of the vehicle with the naked eye in order to drive the vehicle safely.

The headlamp for the vehicle may be turned on when the driver operates a multi-function switch which is arranged in a steering column.

Although a general bulb was used as the headlamp, a lighting technology using a Light Emitted Diode (LED) instead of the bulb has been studied recently and vigorously since the LED is semi-permanent and has an excellent lighting effect.

In the conventional headlamp, since the light emitted from the LED which is arranged in the headlamp is irradiated toward the front of the vehicle as a direct-light type, the illuminance is high if the light is very bright, but there is a problem that a range of the illuminance is narrowed. Besides, in case where the light is also irradiated as an indirect-light type using a reflector, that is, a reflect-light type, the light emitted from the LED is only reflected by the reflector, and accordingly, there is a problem that a range of the illuminance toward the front of the vehicle is badly narrowed likewise the direct-light type.

Since the light irradiated from the headlamp with traveling in a straight line is plainly illuminated toward the front of the vehicle and since the range of illuminance of the irradiated light is narrowed, a driver in a night driving may not look fully around the front of the vehicle by not widely securing the field of view toward the front of the vehicle, and accordingly, a safety driving may be not accomplished.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a headlamp for a vehicle, wherein, by forming the headlamp so that the light irradiated from the headlamp may be surface-emitted as an indirect-light type, the light irradiated from the headlamp is widely illuminated toward the circumference as well as the front of the vehicle to secure a field of view toward the front of the vehicle, and accordingly, a safety driving may be accomplished.

In an aspect of the present invention, the headlamp assembly may include an LED module arranged in a housing of the headlamp, a reflector disposed in the housing and receiving a light from the LED module, wherein the reflector has uneven parts to disperse and reflect the light in a forward direction of the reflector, and a lens arranged in the front of the reflector.

The reflector may include a coupling portion to be engaged with the lens and a reflecting portion having the uneven parts thereon to receive the light of the LED module, wherein the coupling portion and the reflecting portion have an obtuse angle therebetween.

The coupling portion of the reflector may be aligned in a horizontal direction along the forward direction of the reflector, and wherein the LED module emits the light onto the reflecting portion dispersing and reflecting the light in the forward direction of the reflector.

The reflector may be formed along an inner circumference of the housing with a predetermined length and the LED module is arranged along an outer circumference of the reflector.

The reflector may be formed in any one color of a white color, a gray color or a yellow color in order to minimize spot light.

The uneven parts of the reflector may be formed by embossing a front surface of the reflecting portion of the reflector.

The uneven parts of the reflector may have a cross-section formed in saw-tooth-shape and extends with a predetermined length.

The uneven parts of the reflector may be formed to have a right and left width of between approximately 1.0 and approximately 5.0 mm and a height difference of between approximately 1.0 and approximately 3.0 mm.

The lens may be formed in a milky-white color.

According to the headlamp of the vehicle of the present invention, since the light which is irradiated from the LED of the headlamp is dispersed by the uneven parts of the reflector to be reflected, and since the reflected light is surface-emitted toward the front of the vehicle by means of the lens of the front, it is possible to embody a uniform lighting image and secure an excellent light distribution and an excellent lighting merchantability in comparison with a direct-light type. Besides, since the light irradiated from the headlamp is widely illuminated toward the circumference as well as the front of the vehicle to secure a field of view toward the front of the vehicle, and accordingly, a safety driving may be accomplished.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
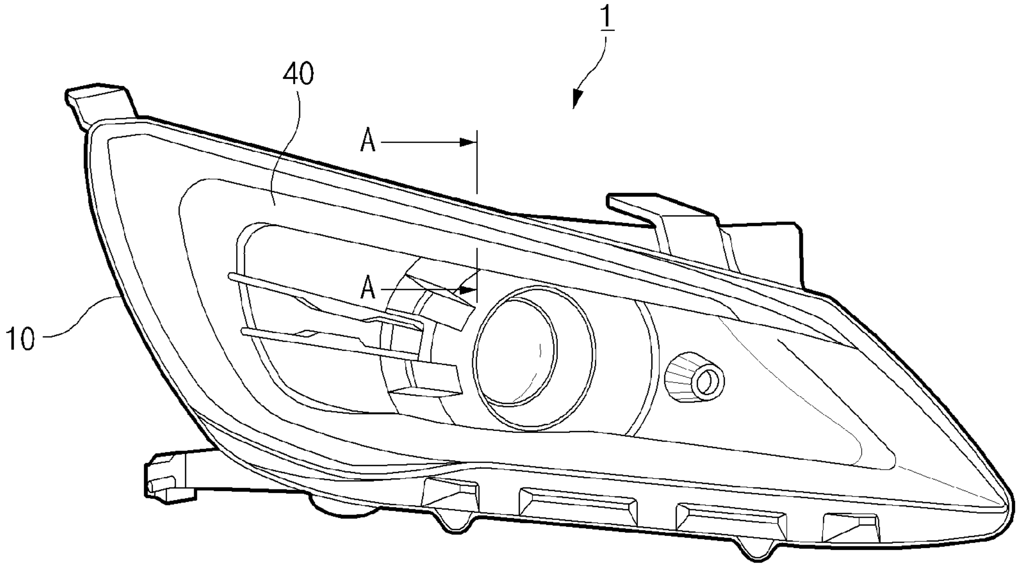
FIG. 1 is a view illustrating an exemplary headlamp for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

FIGS. 1 to 4 of the attaching drawings illustrate a headlamp for a vehicle according to an exemplary embodiment of the present invention.

As shown in FIGS. 1 to 4, a headlamp 1 for a vehicle according to an exemplary embodiment of the present invention includes an LED module 30 arranged in a housing 10 of the headlamp 1, a reflector 20 having uneven parts 21 which disperse and reflect a light toward the front of the vehicle, where the light is emitted from the LED module 30, and a lens 40 arranged in the front of the reflector 20.

Figure 2:
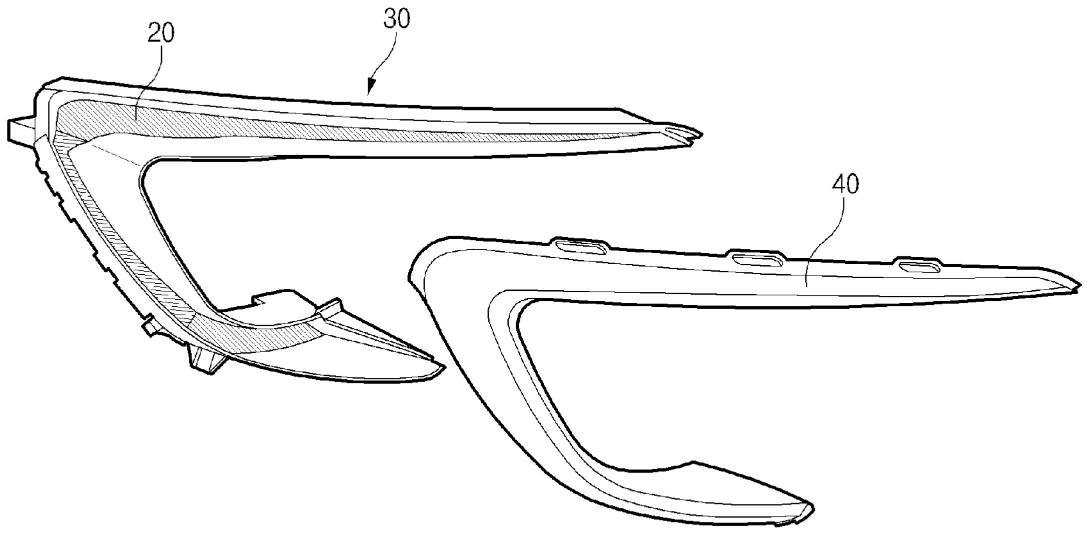
FIG. 2 is a view separately illustrating a reflector and a lens of the exemplary headlamp according to the present invention.
Figure 3:
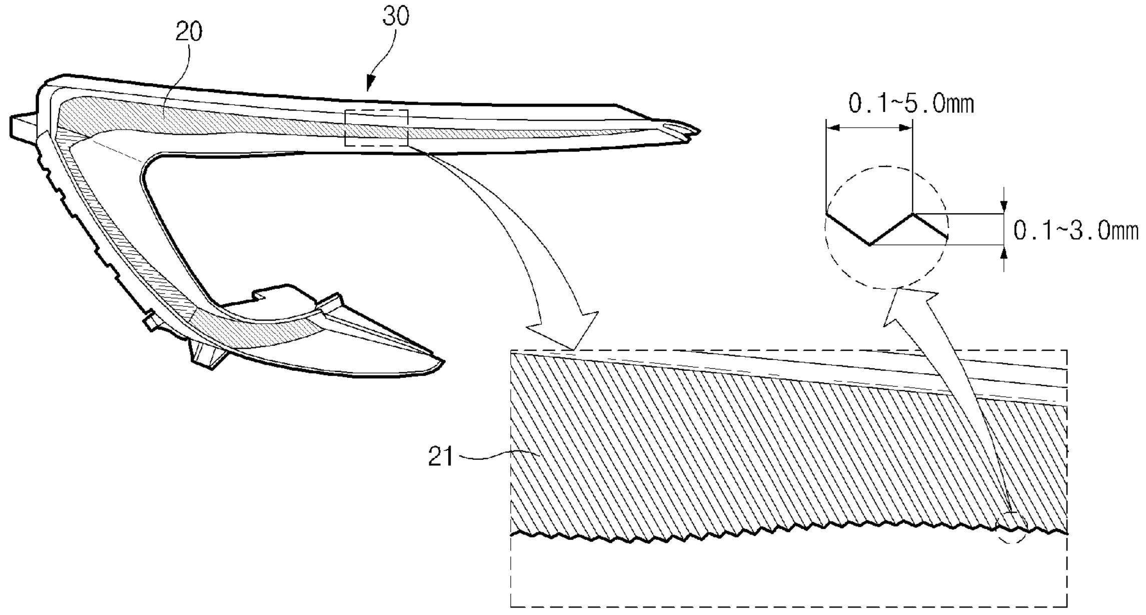
FIG. 3 is a view illustrating a reflector according to the present invention and a detailed view illustrating a part of the reflector.
Figure 4:
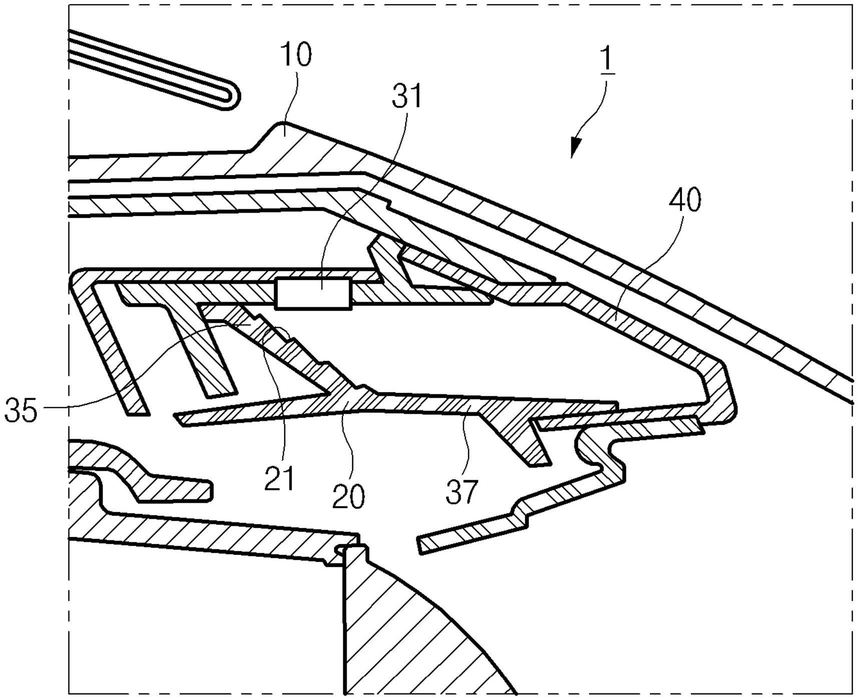
FIG. 4 is a section view illustrating a part which is sectioned along A-A line of FIG. 1.

As shown in FIGS. 2 and 3, the LED module 30 is arranged at outside circumference of the reflector 20, and also a number of LEDs 31 are separately arranged at the equal intervals along the outside circumference of the reflector 20 in the LED module 30.

In addition, the reflector 20 having a reflecting portion 35 and a coupling portion 37 is arranged in the housing 10, in which a shape of the reflector 20 is formed to correspond with a shape of the headlamp 1. The reflecting portion 35 may be coupled to the LED module 30 and the coupling portion 37 may be coupled to the lens 40.

The reflector 20 may be formed in anyone color among a white color, a gray color and a yellow color in order to minimize spot light.

In molding the reflector 20 formed in such colors, the material itself of the reflector 20 may be molded by the material with the above-mentioned colors, or the reflector 20 may be molded by coating the coating materials with the above-mentioned colors. The reflector 20 allows the light to be not spotted and to be diffused when the light emitted from the LED 31 is reflected by the reflector 20.

In an exemplary embodiment of the present invention, the reflector 20 may be formed along inner circumference of the housing 10 with a predetermined length.

Besides, in the reflector 20 arranged at the lower part and side part of the LED module 30, a uneven parts 21 may be formed so as to disperse and reflect the light emitted from the LEDs 31.

In an exemplary embodiment of the present invention, the uneven parts of the reflector may be formed by embossing a front surface of the reflecting portion 35 of the reflector 20. In another exemplary embodiment of the present invention, the uneven parts of the reflector 20 may be formed in saw-tooth-shaped cross-section and extend with a predetermined length.

The uneven parts 21 of the reflector 20 are formed to have a right and left width of 1.0~5.0 mm and a height difference of 1.0~3.0 mm. According to the uneven parts 21 having a range of the above numerical values, the spot light may be minimized, and dispersion and diffusion of light may occur properly.

In addition, in case where the LED module 30 turns on, the reflector 20 having the above uneven parts 21 may prevent from the spot light of the reflector 20 and may diffuse light.

Also, the lens 40 arranged at the front of the reflector 20 may be formed in a milky-white color so as to secure a light distribution and a lighting merchantability, in which a light transmissivity of the lens 40 is formed to have 30~50% (VG40%).

In the above-mentioned headlamp 1 for the vehicle according to an exemplary embodiment of the present invention, in case of turning on the headlamp 1, the light which is emitted from the LED module 30 to the uneven parts 21 of the reflector 20 is dispersed and diffused by the uneven parts 21 of the reflector 20, and then the light is reflected toward the lens 40 of the front. After this, the reflected light is irradiated toward the front of the vehicle through the lens 40 with a light transmissivity of 30~50% (VG40%), and accordingly, the light is not spotted to widely diffuse toward the front side of the headlamp 1. Accordingly, the light may be irradiated toward the front of the vehicle in a surface-emitting state.

Accordingly, the surface-emitting headlamp 1 of an indirect-light type may embody a uniform lighting image and secure an excellent light distribution and an excellent lighting merchantability in comparison with a direct-light type. A light which is surface-emitted from the headlamp 1 is widely irradiated around the front of the vehicle to secure a field of view toward the front of the vehicle, and accordingly, a safety driving may be accomplished.

For convenience in explanation and accurate definition in the appended claims, the terms “upper”, “lower”, “left”, “right” and “front” are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A headlamp assembly for a vehicle, the headlamp assembly comprising:

an LED module arranged in a housing of the headlamp;

a reflector disposed in the housing and receiving a light from the LED module, wherein the reflector has uneven parts to disperse and reflect the light in a forward direction of the reflector; and a lens arranged in the front of the reflector;

wherein the uneven parts of the reflector have a cross-section formed in saw-tooth-shape and extend with a predetermined length; and wherein the uneven parts of the reflector are formed to have a right and left width of between approximately 1.0 and approximately 5.0 mm and a height difference of between approximately 1.0 and approximately 3.0 mm.

2. The headlamp assembly of the vehicle according to claim 1, wherein the lens is formed in a milky-white color.

3. The headlamp assembly of the vehicle according to claim 1, wherein the reflector includes a coupling portion to be engaged with the lens and a reflecting portion having the uneven parts thereon to receive the light of the LED module.

4. The headlamp assembly of the vehicle according to claim 2, wherein the coupling portion and the reflecting portion have an obtuse angle therebetween.

5. The headlamp assembly of the vehicle according to claim 4, wherein the coupling portion of the reflector is aligned in a horizontal direction along the forward direction of the reflector, and wherein the LED module emits the light onto the reflecting portion dispersing and reflecting the light in the forward direction of the reflector.

6. The headlamp assembly of the vehicle according to claim 1, wherein the reflector is formed along an inner circumference of the housing with a predetermined length and the LED module is arranged along an outer circumference of the reflector.

7. The headlamp assembly of the vehicle according to claim 1, wherein the reflector is formed in any one color of a white color, a gray color or a yellow color in order to minimize spot light.

8. The headlamp assembly of the vehicle according to claim 1, wherein the uneven parts of the reflector are formed by embossing a front surface of the reflecting portion of the reflector.

* * * * *